July 24, 1962   R. J. HOOKER ET AL   3,045,920
WIDE FLOW RANGE FUEL INJECTOR
Filed Aug. 29, 1961
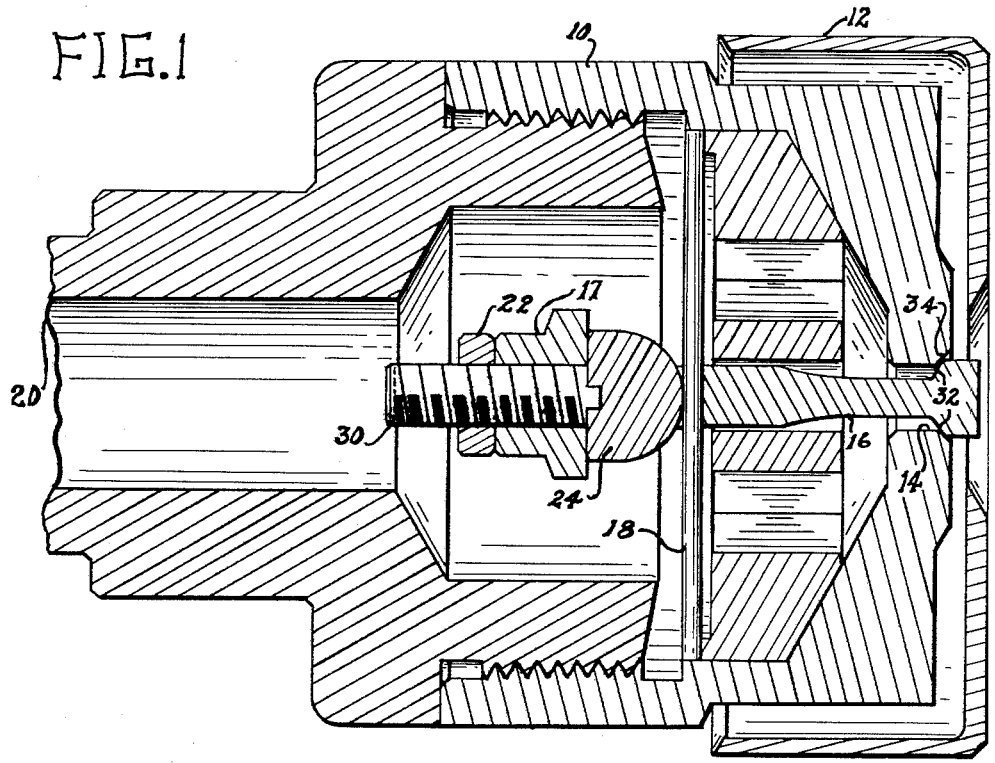
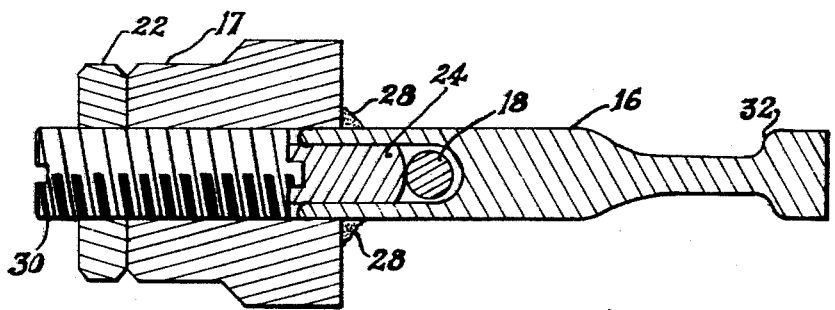
INVENTORS.
RALPH J. HOOKER,
ROBERT W. MACAULAY &
BY JAMES O. BLANTON
ATTORNEYS 3,045,920
WIDE FLOW RANGE FUEL INJECTOR
Ralph J. Hooker, Schenectady, N.Y., and Robert W. Macaulay and James O. Blanton, Cincinnati, Ohio, assignors to the United States of America as represented by the Secretary of the Air Force
Filed Aug. 29, 1961, Ser. No. 134,781
6 Claims. (Cl. 239—105)

This invention relates to fuel injection valves for internal combustion engines and employs a novel spring member to replace the conventional coil spring for closing the nozzle. A half spherical valve head and an air shroud for mixing the fuel and air at the nozzle outlet are also used. A new method of mounting the pintle supporting the poppet head is employed so that it is hydrodynamically self-centering with respect to the nozzle orifice. All of these features contribute to better atomization of fuel and mixing the same with air at the exit of the nozzle orifice to form a perfect pattern of the mixture.

Fuel injection valves now in use employ coil springs for closing the orifice, said springs being either under tension or compression and subject to the torsion problems of aging, hysteresis and fatigue. Present valves of this type are also subject to poor seating of the valve head in the metering orifice which contributes to loss of fuel and poor fuel pattern.

It is an object of this invention to provide a simply supported beam of spring steel to supply the force controlling the seating of the valve head instead of the common coil spring.

It is a further object to provide a wide flow range fuel injector with a self-centering action.

It is a still further object to provide such a valve with a hydrodynamically self-balancing pintle.

The above and still other objects, advantages and features of our invention will become apparent upon consideration of the following detailed description of one embodiment thereof, especially when taken in conjunction with the accompanying drawings, in which:

FIG. 1 is a sectional view showing the essential parts of the invention; and

FIG. 2 is an enlarged sectional view showing the balancing arrangement of the poppet rod or valve stem and the seating of the valve head.

Referring to the drawings the nozzle body or housing is designated 10 and has an air shroud 12 attached thereto. The function of the air shroud is to scour a metering orifice 14 and a valve seat 34, and at the same time to mix the fuel ejected therefrom with air. This scouring and mixing action is due to a whirling motion of the air imparted by vanes (not shown) in the said shroud 12. Fuel enters the nozzle through a fuel line connection shown at 20. The numeral 16 designates the poppet rod, valve stem or pintle, as it is variously called, and is shown at 28 as welded, soldered or otherwise fixed to an internally threaded extension 17 thereof. The pintle 16 and its extension 17 are slotted to accommodate a segment of a hemisphere 24 which bears against a spring rod 18 mounted in the housing 10. The spring rod 18 takes the place of the usual coil spring and seats a valve head 32 of pintle 16 in a valve seat 34. As can be seen in both FIGS. 1 and 2, the poppet rod 16 is arranged in pendulum fashion and is balanced by the hemispherical segment 24 on the spring rod 18, thus it is free to move in any direction. This arrangement provides for hydrodynamic seating of the valve head 32, which itself has the spherical shape of a half ball, in the valve seat 34. The spring rod, being loaded as a simple beam with a concentrated load at its center, allows the rod, its mounting, and the swivel half ball 24 to act as an universal joint. This is an advantage in that no matter what angle the valve head takes it will fit in the valve seat 34 as a ball fits in a hollow cone. This not only makes the fit of the head snug at any angle but assures a uniform pattern of fuel flow where fuel is forced through the orifice. A positioning bolt 30 bears against and is seated in a recess in the segment of the hemisphere 24 to bear against the spring 18 to adjust the poppet rod 16. The parts are fixed in position by a lock nut 22.

From the above description, it is clear that this invention has fulfilled all the objects set for it. Its advantages over conventional coil spring valves is that the spring rod overcomes most of the disadvantages of coiled springs while the ball suspension of the poppet rod assures a hydrodynamically balanced valve. The shape of the valve head assures, with the ball suspension of the poppet rod, an even flow from a variable area nozzle.

It is to be understood that the above described arrangement is merely illustrative of the application of the principles of the invention. Numerous other arrangements may be devised by those skilled in the art without departing from the spririt and scope of the invention.

What we claim is:

1. A variable area injection nozzle comprising a nozzle housing having fuel inlet and an outlet, a valve seat in said outlet, a valve head which is adapted to cooperate with said valve seat, a valve stem secured to said valve head and extending into said housing, said valve stem having a slot therethrough, a spring rod of circular cross-section mounted in said housing transverse to said valve stem and extending through the slot in said valve stem, means in said slot in contact with said spring rod for biasing said valve head to a closed position.

2. A variable area injection nozzle as described in claim 1 wherein the valve end of said nozzle is provided with an air shroud to direct air to the exit of said valve seat.

3. A variable area injection nozzle as described in claim 1 wherein said spring rod is mounted perpendicular to the movement to said valve.

4. A variable area injection nozzle as described in claim 1 wherein the said valve seat is a hollow cone.

5. A variable area injection nozzle as described in claim 4 wherein said valve head has a spherical portion for engagement with said valve seat.

6. A variable area injection nozzle as described in claim 4 wherein said means in said slot comprises a segment of a hemisphere within said valve stem for cooperation with said spring rod to form an universal joint.

References Cited in the file of this patent
UNITED STATES PATENTS

| 2,612,408 | Kurata | Sept. 30, 1952 |
| 2,970,772 | Boosinger et al. | Feb. 7, 1961 |

FOREIGN PATENTS

| 423,087 | Italy | July 3, 1947 |